(12) United States Patent
Liu

(10) Patent No.: US 12,206,337 B2
(45) Date of Patent: Jan. 21, 2025

(54) POWER CONVERSION DEVICE AND CONTROL CIRCUIT WITH INPUT CAPACITOR DISCHARGE FUNCTION

(71) Applicant: Power Forest Technology Corporation, Hsinchu County (TW)

(72) Inventor: Chia-Hsien Liu, Hsinchu County (TW)

(73) Assignee: Power Forest Technology Corporation, Hsinchu County (TW)

( * ) Notice: Subject to any disclaimer, the term of this patent is extended or adjusted under 35 U.S.C. 154(b) by 296 days.

(21) Appl. No.: 17/963,172

(22) Filed: Oct. 10, 2022

(65) Prior Publication Data

US 2024/0048065 A1 Feb. 8, 2024

(30) Foreign Application Priority Data

Aug. 5, 2022 (TW) .................................. 111129463

(51) Int. Cl.
*H02M 7/04* (2006.01)
*H02M 1/00* (2006.01)
*H02M 1/32* (2007.01)
*H02M 1/42* (2007.01)
*H02M 7/219* (2006.01)

(52) U.S. Cl.
CPC ............ *H02M 7/05* (2021.05); *H02M 1/007* (2021.05); *H02M 1/322* (2021.05); *H02M 1/4225* (2013.01); *H02M 7/219* (2013.01)

(58) Field of Classification Search
CPC ........ H02M 1/32; H02M 1/322; H02M 1/007; H02M 1/4225; H02M 7/05; H02M 7/06
See application file for complete search history.

(56) References Cited

U.S. PATENT DOCUMENTS

| | | | |
|---|---|---|---|
| 9,837,917 B1* | 12/2017 | Furtner | H02M 3/33523 |
| 10,090,775 B2 | 10/2018 | Halberstadt | |
| 10,170,975 B1 | 1/2019 | Feng et al. | |
| 11,228,239 B2 | 1/2022 | Benabdelaziz et al. | |
| 2010/0207664 A1* | 8/2010 | Hsu | H03K 5/153 327/72 |
| 2011/0280053 A1* | 11/2011 | Halberstadt | H02M 3/155 363/126 |
| 2013/0188405 A1* | 7/2013 | Jin | H02M 1/32 363/49 |
| 2016/0268919 A1* | 9/2016 | Halberstadt | H02M 1/32 |

* cited by examiner

*Primary Examiner* — Jue Zhang
*Assistant Examiner* — Jye-June Lee
(74) *Attorney, Agent, or Firm* — JCIPRNET

(57) ABSTRACT

A power conversion device and a control circuit are provided. The power conversion device includes a power conversion circuit and a control circuit. The control circuit includes a first controller and a second controller. The power conversion circuit includes an input capacitor, a rectifier circuit, and a power switch. The input capacitor is coupled to an input terminal of the power conversion device. The rectifier circuit converts an input AC power into a rectified power. The first controller operates the power switch to cause the power conversion circuit to convert the rectified power into an output power. The second controller detects a signal waveform at the input terminal, and controls the first controller in response to the signal waveform at the input terminal, so as to utilize the power switch to discharge the charge stored in the input capacitor.

12 Claims, 6 Drawing Sheets

POWER CONVERSION DEVICE AND CONTROL CIRCUIT WITH INPUT CAPACITOR DISCHARGE FUNCTION

CROSS-REFERENCE TO RELATED APPLICATION

This application claims the priority benefit of Taiwan application serial no. 111129463, filed on Aug. 5, 2022. The entirety of the above-mentioned patent application is hereby incorporated by reference herein and made a part of this specification.

BACKGROUND

Technical Field

The disclosure relates to a power conversion device and a control circuit, and particularly relates to a power conversion device and a control circuit capable of discharging the charge stored in an input capacitor.

Description of Related Art

Today's power conversion devices tend to be miniaturized. The input terminal of a power conversion device has only two input pins. An input capacitor (or safety capacitor) is arranged between the two input pins of the power conversion device. Due to the high voltage application requirements, the input capacitor discharge function of the power conversion device is necessary.

In order to equip the power conversion device with the input capacitor discharge function, the power conversion device includes a discharge resistor. The discharge resistor is coupled in parallel with the input capacitor. The discharge resistor is used to discharge the charge stored in the input capacitor. Therefore, when the power conversion device is unplugged from an input power source, the discharge resistor can reduce the risk of electric shock for the user touching the input terminal of the power conversion device.

However, the configuration of the discharge resistor causes the power conversion device to have a preset power consumption. The power consumption inevitably affects the efficiency and power factor of the power conversion device. Therefore, providing an input capacitor discharge function, other than the discharge resistor, is an issue that needs to be addressed.

SUMMARY

The disclosure provides a power conversion device and a control circuit capable of discharging the charge stored in an input capacitor.

The power conversion device according to an embodiment of the disclosure includes a power conversion circuit and a control circuit. The control circuit includes a first controller and a second controller. The power conversion circuit includes an input capacitor, a rectifier circuit, and a power switch. The input capacitor is coupled to an input terminal of the power conversion device. The rectifier circuit is coupled to the input terminal. The rectifier circuit converts an input AC power into a rectified power. A first terminal of the power switch is coupled to the rectifier circuit. The first controller is coupled to a control terminal of the power switch. The first controller operates the power switch to cause the power conversion circuit to convert the rectified power into an output power. The second controller is coupled to the input terminal and the first controller. The second controller detects a signal waveform at the input terminal, and controls the first controller in response to the signal waveform at the input terminal, so as to utilize the power switch to discharge the charge stored in the input capacitor.

The control circuit according to an embodiment of the disclosure is configured to control a power conversion circuit. The power conversion circuit includes an input capacitor, a rectifier circuit, and a power switch. The input capacitor is coupled to an input terminal of a power conversion device. The rectifier circuit converts an input AC power into a rectified power. A first terminal of the power switch is coupled to the rectifier circuit. The control circuit includes: a first controller and a second controller. The first controller is coupled to a control terminal of the power switch. The first controller operates the power switch to cause the power conversion circuit to convert the rectified power into an output power. The second controller is coupled to the input terminal and the first controller. The second controller detects a signal waveform at the input terminal, and controls the first controller in response to the signal waveform at the input terminal, so as to utilize the power switch to discharge the charge stored in the input capacitor.

Based on the above, the second controller detects the signal waveform at the input terminal, and controls the first controller in response to the signal waveform at the input terminal, so as to utilize the power switch to discharge the charge stored in the input capacitor. Compared to the conventional input capacitor discharge function, the disclosure can reduce power consumption and maintain high efficiency and high power factor of the power conversion device.

In order to make the above and other features and advantages of the disclosure easy to understand, exemplary embodiments will be described in detail with reference to the accompanying drawings as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

Figure 1:
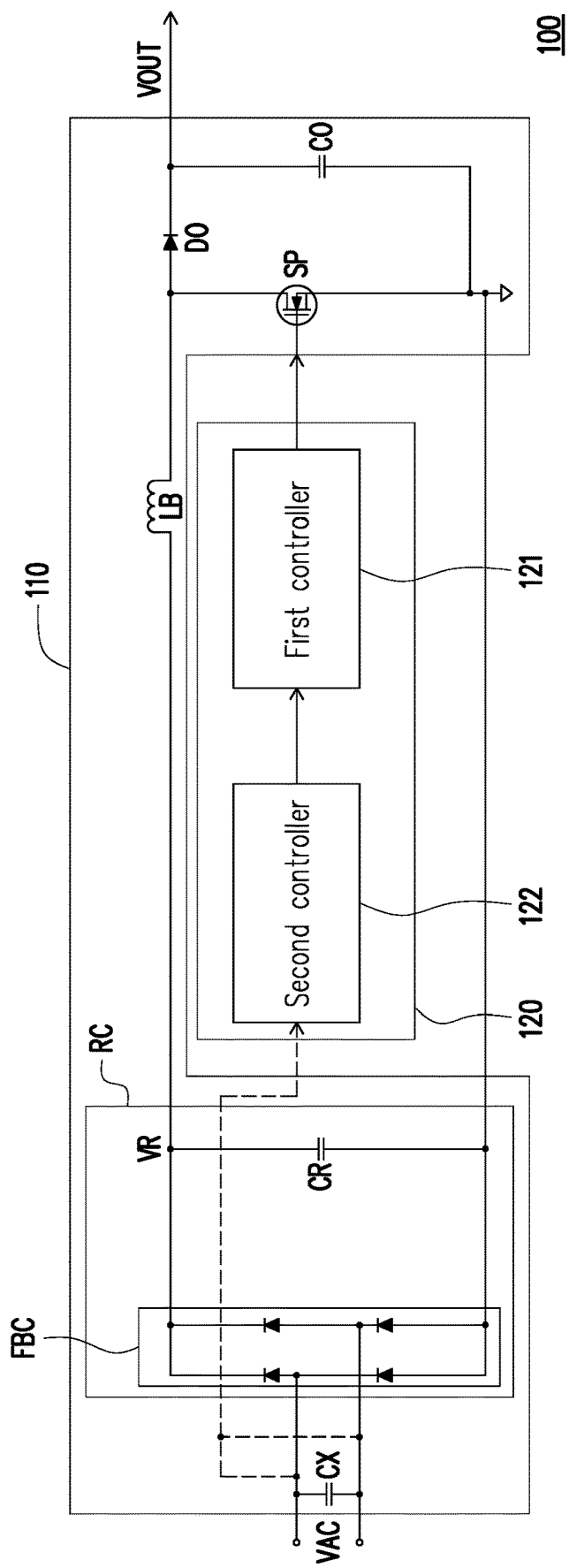
FIG. 1 is a schematic diagram of the power conversion device according to the first embodiment of the disclosure.

Some exemplary embodiments of the disclosure will be described in detail hereinafter with reference to the accompanying drawings. Regarding the reference numerals mentioned in the following description, the same reference numerals shown in different drawings will be regarded as representing the same or similar elements. These embodiments are merely part of the disclosure and do not disclose all possible embodiments of the disclosure. To be more specific, these embodiments are merely examples within the scope of the claims.

Referring to FIG. 1, FIG. 1 is a schematic diagram of the power conversion device according to the first embodiment of the disclosure. In this embodiment, the power conversion device 100 includes a power conversion circuit 110 and a control circuit 120. The power conversion circuit 110 at least includes an input capacitor CX, a rectifier circuit RC, and a power switch SP. The input capacitor CX is coupled to the input terminal of the power conversion device 100. In this embodiment, the input capacitor CX is a safety capacitor, such as an X capacitor. The input capacitor CX is coupled between two input pins of the input terminal. The rectifier circuit RC is coupled to the input terminal. The rectifier circuit RC converts an input AC power VAC into a rectified power VR. The first terminal of the power switch SP is coupled to the rectifier circuit RC. The second terminal of the power switch SP is coupled to a reference low voltage (for example, ground).

In this embodiment, the control circuit 120 includes a first controller 121 and a second controller 122. The first controller 121 is coupled to the control terminal of the power switch SP. The first controller 121 operates the power switch SP to cause the power conversion circuit 110 to convert the rectified power VR into an output power VOUT. The second controller 122 is coupled to the input terminal and the first controller 121. The second controller 122 detects a signal waveform at the input terminal. The second controller 122 also controls the first controller 121 in response to the signal waveform at the input terminal, so as to utilize the power switch SP to discharge the charge stored in the input capacitor CX.

It is worth mentioning that the second controller 122 detects the signal waveform at the input terminal, and controls the first controller 121 in response to the signal waveform at the input terminal, so as to utilize the power switch SP to discharge the charge stored in the input capacitor CX. Thus, compared to the conventional input capacitor discharge function, the control circuit 120 can reduce power consumption and maintain high efficiency and high power factor of the power conversion device 100. In addition, the power conversion circuit 110 discharges the charge stored in the input capacitor CX through the existing loop or power conversion function of the power conversion circuit 110. Thus, the design of the power conversion circuit 110 does not need to be changed.

In this embodiment, the power conversion circuit 110 is implemented by, for example, a boost power conversion circuit. The power conversion circuit 110 further includes a boost inductor LB, an output diode DO, and an output capacitor CO. The boost inductor LB is coupled between the rectifier circuit RC and the first terminal of the power switch SP. The anode of the output diode DO is coupled to the first terminal of the power switch SP. The cathode of the output diode DO serves as the output terminal of the power conversion circuit 110. The output capacitor CO is coupled between the cathode of the output diode DO and the reference low voltage. In this embodiment, the rectifier circuit RC includes, for example, a full-bridge rectifier circuit FBC and a rectifier capacitor CR. The power conversion circuit of the disclosure is not limited to this embodiment. In some embodiments, the power conversion circuit 110 may be implemented by the rectifier circuit RC and a power conversion circuit with a power switch. The power conversion circuit may be, for example, a flyback converter, a buck power conversion circuit or an LLC resonant converter.

Figure 2:
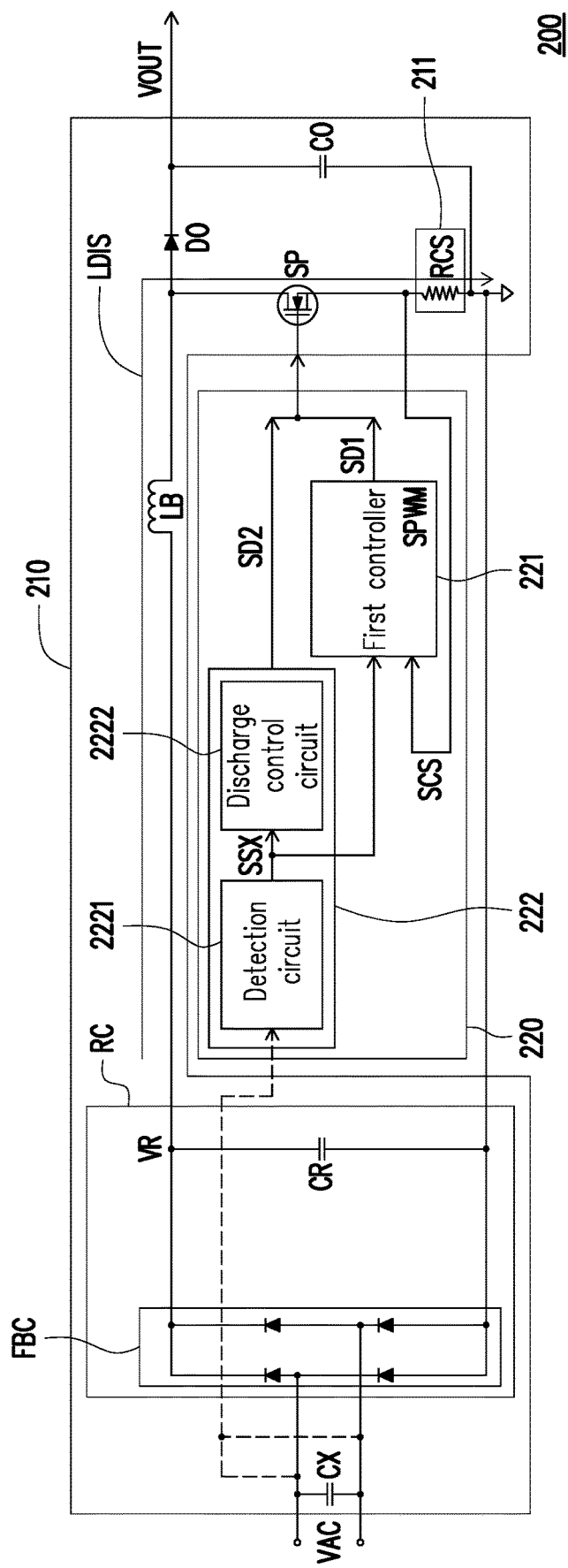
FIG. 2 is a schematic diagram of the power conversion device according to the second embodiment of the disclosure.

Referring to FIG. 2, FIG. 2 is a schematic diagram of the power conversion device according to the second embodiment of the disclosure. In this embodiment, the power conversion device 200 includes a power conversion circuit 210 and a control circuit 220. The power conversion circuit 210 includes an input capacitor CX, a rectifier circuit RC, a power switch SP, a boost inductor LB, an output diode DO, an output capacitor CO, and a current value sensing circuit 211. The input capacitor CX is coupled to the input terminal of the power conversion device 200. In this embodiment, the input capacitor CX is a safety capacitor, such as an X capacitor. The input capacitor CX is coupled between two input pins of the input terminal. The rectifier circuit RC is coupled to the input terminal. The rectifier circuit RC converts an input AC power VAC into a rectified power VR. The first terminal of the power switch SP is coupled to the rectifier circuit RC. The boost inductor LB is coupled between the rectifier circuit RC and the first terminal of the power switch SP. The current value sensing circuit 211 is coupled between the second terminal of the power switch SP and the reference low voltage. The current value sensing circuit 211 provides a feedback signal SCS in response to the current value of the current flowing through the power switch SP. In other words, the power conversion circuit provides the feedback signal SCS based on the current value of the current flowing through the power switch SP. The anode of the output diode DO is coupled to the first terminal of the power switch SP. The cathode of the output diode DO serves as the output terminal of the power conversion circuit 210. The output capacitor CO is coupled between the cathode of the output diode DO and the reference low voltage.

In this embodiment, the control circuit 220 includes a first controller 221 and a second controller 222. The first controller 221 is coupled to the current value sensing circuit 211 and the power switch SP. The first controller 221 generates a driving signal SD1 in response to a pulse-width modulation (PWM) signal SPWM. The duty cycle of the driving signal SD1 is determined by the pulse width of the pulse-width modulation (PWM) signal SPWM. The power switch SP operates in response to the driving signal SD1. Therefore, based on the driving signal SD1, the power conversion circuit 210 converts the rectified power VR into an output power VOUT. In addition, the first controller 221 adjusts the duty cycle of the driving signal SD1 according to the feedback signal SCS. Therefore, the first controller 221 can support the constant current control of the power conversion circuit 210. For example, the current value sensing circuit 211 includes a sensing resistor RCS (the disclosure is not limited thereto). The sensing resistor RCS is coupled between the second terminal of the power switch SP and the reference low voltage. The current value sensing circuit 211 converts the current flowing through the power switch SP into the feedback signal SCS. Therefore, the voltage value of the feedback signal SCS is positively correlated with the current value of the current flowing through the power switch SP. When the voltage value of the feedback signal SCS rises to a first preset voltage value, the first controller 221 reduces the duty cycle of the driving signal SD1. On the other hand, when the voltage value of the feedback signal SCS drops to a second preset voltage value, the first controller 221 increases the duty cycle of the driving signal SD1. In this embodiment, the first preset voltage value is set to be greater than or equal to the second preset voltage value.

In this embodiment, the second controller 222 includes a detection circuit 2221 and a discharge control circuit 2222. The detection circuit 2221 is coupled to the input terminal. The detection circuit 2221 detects a signal waveform at the input terminal, and generates a state signal according to the signal waveform at the input terminal. When the waveform of the input AC power VAC is detected, it means that the power conversion device 200 is connected to the input AC power VAC. Therefore, the detection circuit 2221 generates a state signal SSX having a first voltage value. On the other hand, when the waveform of the input AC power VAC is not detected within a preset time length, it means that the power conversion device 200 has been disconnected from the input AC power VAC. Therefore, the detection circuit 2221 generates a state signal SSX having a second voltage value. The first voltage value is different from the second voltage value. For example, the first voltage value is a low voltage value. The second voltage value is a high voltage value.

It should be noted that the above-mentioned preset time length is equal to a plurality of cycles of the input AC power VAC. That is to say, the state signal SSX having the second voltage value is generated when the detection circuit 2221 does not detect the voltage sine wave waveform of the input AC power VAC within the plurality of cycles of the input AC power VAC. Thus, the malfunction of the control circuit 220 due to the unstable transient state of the input AC power VAC can be avoided.

In this embodiment, the state signal SSX may be a flag signal. The first voltage value corresponds to a first state flag value. The second voltage value corresponds to a second state flag value different from the first state flag value.

In this embodiment, the discharge control circuit 2222 is coupled to the detection circuit 2221 and the first controller 221. The discharge control circuit 2222 is disabled in response to the state signal SSX having the first voltage value. The discharge control circuit 2222 is enabled in response to the state signal SSX having the second voltage value to control the power switch SP, so as to discharge the charge stored in the input capacitor CX. The discharge control circuit 2222 provides a driving signal SD2 to control the power switch SP to discharge the charge stored in the input capacitor CX.

That is, when the power conversion device 200 is connected to the input AC power VAC, the second controller 222 disables the discharge control circuit 2222 in response to the state signal SSX having the first voltage value. The power conversion circuit 210 converts the rectified power VR into the output power VOUT. When the power conversion device 200 is disconnected from the input AC power VAC, the second controller 222 disables the first controller 221 in response to the state signal SSX having the second voltage value. In addition, the second controller 222 also controls the power switch SP in response to the state signal SSX having the second voltage value, so as to cause the charge stored in the input capacitor CX to flow through the first terminal of the power switch SP and the second terminal of the power switch SP. Thus, the power conversion device 200 can discharge the charge stored in the input capacitor CX to the reference low voltage through the boost inductor LB and the discharge loop LDIS of the power switch SP.

Figure 3:
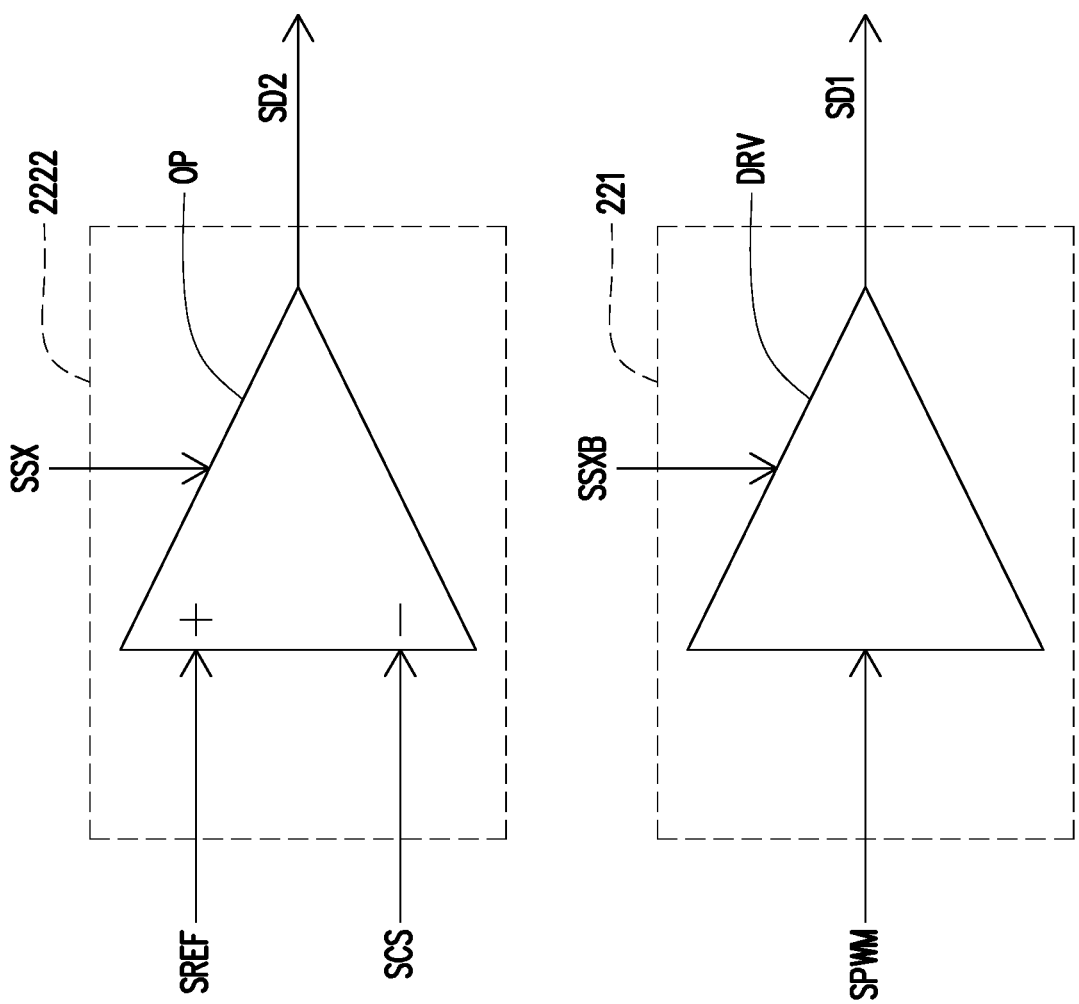
FIG. 3 is a schematic diagram of the discharge control circuit and the first controller according to an embodiment of the disclosure.

Referring to FIG. 2 and FIG. 3. FIG. 3 is a schematic diagram of the discharge control circuit and the first controller according to an embodiment of the disclosure. The first controller 221 includes a driver DRV. The driver DRV uses the PWM signal SPWM to generate the driving signal SD1 in response to a complementary state signal SSXB. In this embodiment, the driver DRV may be implemented by a buffer or a follower. In this embodiment, the discharge control circuit 2222 includes an operational amplifier OP. The operational amplifier OP is coupled to the power switch SP and the detection circuit 2211. The operational amplifier OP is enabled in response to the state signal SSX having the second voltage value, and controls the power switch SP according to the comparison result between the feedback signal SCS and a reference signal SREF. The operational amplifier OP is disabled in response to the state signal SSX having the first voltage value. In this embodiment, the reference signal SREF is a voltage signal having a preset voltage value.

In this embodiment, the complementary state signal SSXB and the state signal SSX are mutually inverted. The first controller 221 may receive the state signal SSX, and use an inverter (not shown) to invert the state signal SSX to generate the complementary state signal SSXB. When the state signal SSX has the first voltage value, the driver DRV is enabled to generate the driving signal SD1 according to the complementary state signal SSXB having the second voltage value. The operational amplifier OP is disabled in response to the state signal SSX having the first voltage value, and stops generating the driving signal SD2. When the state signal SSX has the second voltage value, the driver DRV is disabled according to the complementary state signal SSXB having the first voltage value. For example, the driver DRV is disabled to enter a high impedance (Hi-Z) state to stop generating the driving signal SD1. The operational amplifier OP is enabled in response to the state signal SSX having the second voltage value to generate the driving signal SD2.

In this embodiment, the operational amplifier OP has an inverting input terminal, a non-inverting input terminal, and an output terminal. The inverting input terminal of the operational amplifier OP is used to receive the feedback signal SCS. The non-inverting input terminal of the operational amplifier OP is used to receive the reference signal SREF. The output terminal of the operational amplifier OP is coupled to the control terminal of the power switch SP. The operational amplifier OP compares the voltage value of the feedback signal SCS with the reference voltage value of the reference signal SREF. The reference voltage value of the reference signal SREF is constant. The operational amplifier OP and the power switch SP together form a voltage regulation circuit, such as a low dropout (LDO) regulation circuit. When the voltage value of the feedback signal SCS is higher than the reference voltage value of the reference signal SREF, the operational amplifier OP reduces the voltage level of the driving signal SD2. When the voltage value of the feedback signal SCS is lower than or equal to the reference voltage value of the reference signal SREF, the operational amplifier OP increases the voltage level of the driving signal SD2. Thus, the operational amplifier OP can provide a stable input capacitor discharge function. The discharge current value on the discharge loop LDIS is substantially constant.

Figure 4:
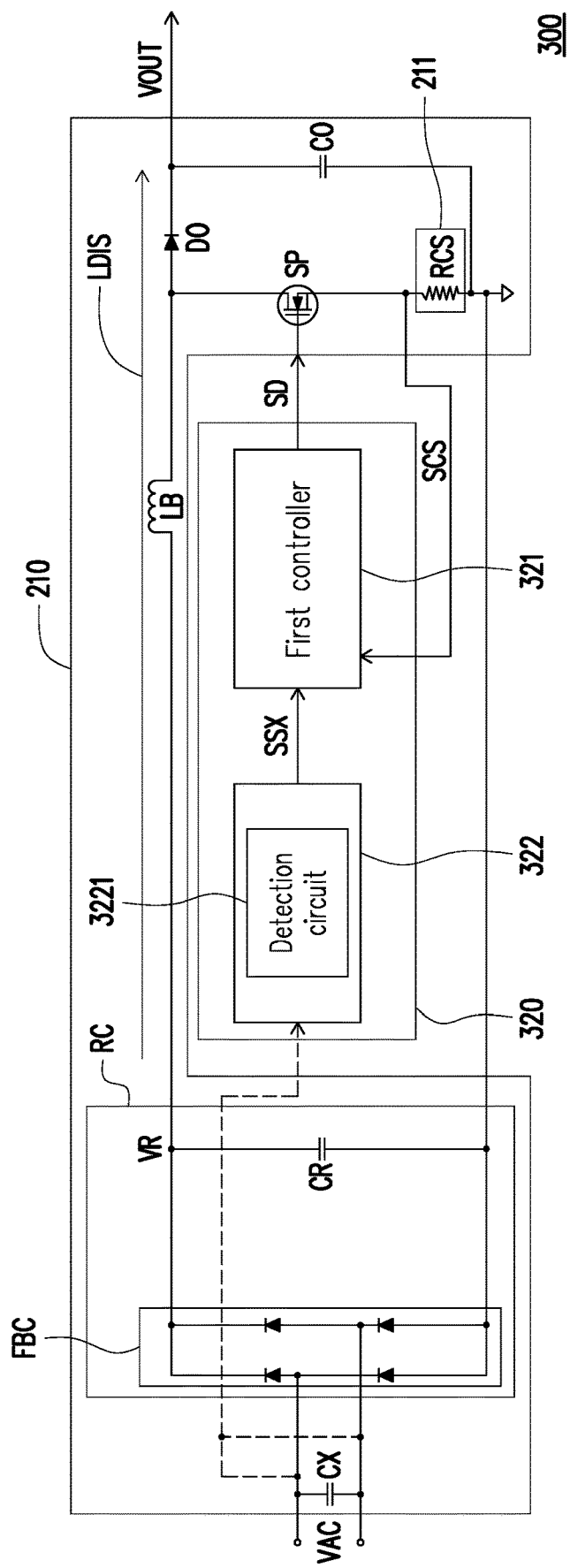
FIG. 4 is a schematic diagram of the power conversion device according to the third embodiment of the disclosure.

Referring to FIG. 4, FIG. 4 is a schematic diagram of the power conversion device according to the third embodiment of the disclosure. In this embodiment, the power conversion device 300 includes a power conversion circuit 210 and a control circuit 320. The configuration of the power conversion circuit 210 has been clearly explained in the embodiment of FIG. 2, and therefore, will not be repeated here. In this embodiment, the control circuit 320 includes a first controller 321 and a second controller 322. The second controller 322 detects the signal waveform at the input terminal of the power conversion device 300 to determine whether the power conversion circuit 210 receives the input AC power VAC. When the power conversion circuit 210 does not receive the input AC power VAC, the second controller 322 controls the first controller 321 to cause the power conversion circuit 210 to convert the charge stored in the input capacitor CX into the output power VOUT, so as to consume the charge stored in the input capacitor CX. Thus, the power conversion device 300 can discharge the charge stored in the input capacitor CX through the boost inductor LB and the output diode DO and the discharge loop LDIS of the output terminal of the power conversion device 300.

Taking this embodiment as an example, the second controller 322 includes a detection circuit 3221. The detection circuit 3221 is coupled to the input terminal to detect the signal waveform at the input terminal of the power conversion device 300. When the waveform of the input AC power VAC is detected, the detection circuit 3221 generates the state signal SSX having the first voltage value. On the other hand, when the waveform of the input AC power VAC is not detected within the preset time length, the detection circuit 3221 generates the state signal SSX having the second voltage value. Based on the control of the second controller 322, the first controller 321 generates the PWM signal SPWM according to the fluctuation of the feedback signal SCS and the second voltage value of the state signal SSX. The first controller 321 also generates the driving signal SD according to the PWM signal SPWM, and provides the driving signal SD to the control terminal of the power switch SP. The duty cycle of the driving signal SD is related to the voltage value of the feedback signal SCS. Thus, the first controller 321 can provide a stable input capacitor discharge function. The discharge power on the discharge loop LDIS is substantially constant.

Figure 5:
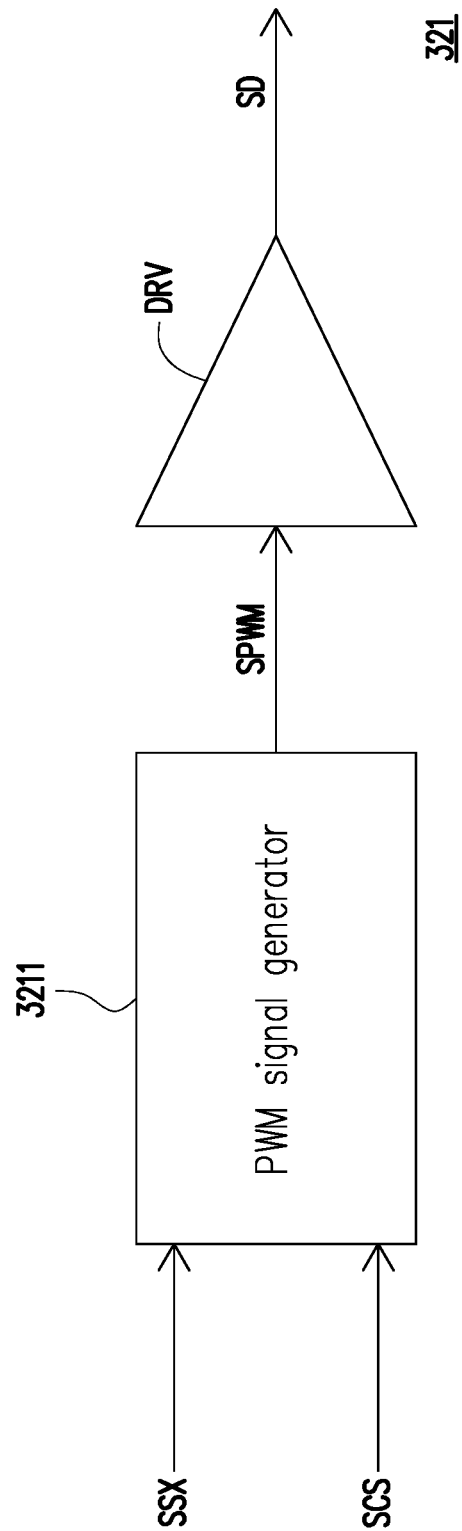
FIG. 5 is a schematic diagram of the first controller according to an embodiment of the disclosure.

Referring to FIG. 4 and FIG. 5, FIG. 5 is a schematic diagram of the first controller according to an embodiment of the disclosure. The first controller 321 includes a PWM signal generator 3211 and a driver DRV. The PWM signal generator 3211 is coupled to the second controller 322 and the current value sensing circuit 211. The PWM signal generator 3211 receives the state signal SSX from the detection circuit 3221 and the feedback signal SCS from the current value sensing circuit 211. When receiving the state signal SSX having the first voltage value (low voltage value), the PWM signal generator 3211 generates the PWM signal SPWM according to the fluctuation of the voltage value of the feedback signal SCS. The driver DRV generates the driving signal SD according to the PWM signal SPWM. Therefore, the power conversion circuit 210 can provide a stable output power VOUT according to the fluctuation of the voltage value of the feedback signal SCS.

When receiving the state signal SSX having the second voltage value (for example, a preset voltage value higher than the low voltage value), the PWM signal generator 3211 dynamically determines the duty cycle of the PWM signal SPWM according to the fluctuation of the voltage value of the feedback signal SCS and the second voltage value of the state signal SSX. The voltage value of the feedback signal SCS at this time is related to the average current value of the current flowing through the power switch SP.

For example, the time length during which the voltage value of the feedback signal SCS is less than the second voltage value is positively correlated with the duty cycle of the PWM signal SPWM. Once the voltage value of the feedback signal SCS is less than the second voltage value, it means that the power in the boost inductor LB is insufficient. The duty cycle of the PWM signal SPWM is increased (the disclosure is not limited to the adjustment method of this embodiment). Therefore, the time length during which the power switch SP is turned on is increased to enable the boost inductor LB to accumulate sufficient power. Therefore, the first controller 321 can precisely adjust the duty cycle of the driving signal SD based on the fluctuation of the voltage value of the feedback signal SCS and the second voltage value of the state signal SSX. Thus, the power conversion circuit 210 can convert the charge stored in the input capacitor CX into a stable output power VOUT, so as to consume the charge stored in the input capacitor CX.

In some embodiments, the PWM signal generator 3211 may include a comparator. The comparator provides the PWM signal SPWM according to a voltage value comparison result between the voltage value of the feedback signal SCS and the second voltage value of the state signal SSX.

Figure 6:
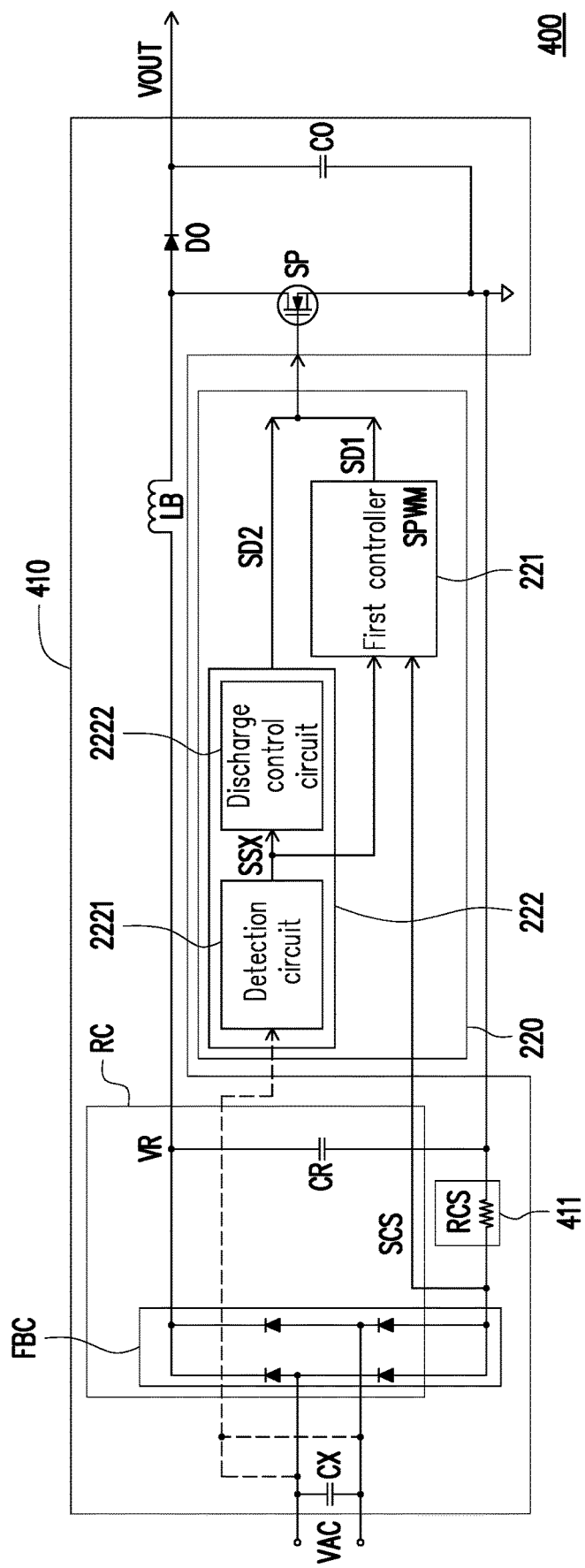
FIG. 6 is a schematic diagram of the power conversion device according to the fourth embodiment of the disclosure.

Referring to FIG. 6, FIG. 6 is a schematic diagram of the power conversion device according to the fourth embodiment of the disclosure. In this embodiment, the power conversion device 400 includes a power conversion circuit 410 and a control circuit 220. The power conversion circuit 410 includes an input capacitor CX, a rectifier circuit RC, a power switch SP, a boost inductor LB, an output diode DO, an output capacitor CO, and a current value sensing circuit 411. The input capacitor CX is coupled to the input terminal of the power conversion device 200. The rectifier circuit RC converts an input AC power VAC into a rectified power VR. The first terminal of the power switch SP is coupled to the rectifier circuit RC. The boost inductor LB is coupled between the rectifier circuit RC and the first terminal of the power switch SP. The second terminal of the power switch SP is coupled to the reference low voltage. The control terminal of the power switch SP is coupled to the control circuit 220. The anode of the output diode DO is coupled to the first terminal of the power switch SP. The cathode of the output diode DO serves as the output terminal of the power conversion circuit 210. The output capacitor CO is coupled between the cathode of the output diode DO and the reference low voltage.

The current value sensing circuit 411 of this embodiment is coupled in a manner different from the current value sensing circuit 211 shown in FIG. 2. In this embodiment, the current value sensing circuit 411 is coupled between the low voltage terminal of the bridge rectifier FBC of the rectifier circuit and the reference low voltage. The current value sensing circuit 411 provides the feedback signal SCS in response to the current value of the current flowing through the power switch SP. The current value sensing circuit 211 includes a sensing resistor RCS. The first terminal of the sensing resistor RCS is coupled to the low voltage terminal of the bridge rectifier FBC of the rectifier circuit. The second terminal of the sensing resistor RCS is coupled to the reference low voltage. The second terminal of the sensing resistor RCS is used to provide the feedback signal SCS.

The configuration of the control circuit 220 in this embodiment has been clearly explained in the embodiment of FIG. 2, and therefore, will not be repeated here.

To sum up, the power conversion device and the control circuit according to the disclosure use the second controller to detect the signal waveform at the input terminal, and control the first controller in response to the signal waveform at the input terminal, so as to utilize the power switch to discharge the charge stored in the input capacitor. Thus, compared to the conventional input capacitor discharge function, the disclosure can reduce power consumption and maintain high efficiency and high power factor for the power conversion device. The disclosure discharges the charge stored in the input capacitor through the existing loop or power conversion function of the power conversion circuit. Thus, the design of the power conversion circuit does not need to be changed. In addition, the disclosure can dynamically adjust the duty cycle of the driving signal through the feedback signal. Thus, based on the duty cycle of the driving signal, the discharge current value or the discharge power for discharging the charge stored in the input capacitor is substantially constant.

Although the disclosure has been described with reference to the embodiments above, they are not intended to limit the disclosure. Those skilled in the art can make some changes and modifications without departing from the spirit and scope of the disclosure. Therefore, the protection scope of the disclosure should be determined by the appended claims.

What is claimed is:

1. A power conversion device, comprising:
   a power conversion circuit which comprises:
   an input capacitor coupled to an input terminal of the power conversion device;
   a rectifier circuit coupled to the input terminal and configured to convert an input AC power into a rectified power; and
   a power switch, wherein a first terminal of the power switch is coupled to the rectifier circuit; and
   a control circuit which comprises:
   a first controller coupled to a control terminal of the power switch and configured to operate the power switch to cause the power conversion circuit to convert the rectified power into an output power; and
   a second controller coupled to the input terminal and the first controller and configured to detect a signal waveform at the input terminal and control the first controller in response to the signal waveform at the input terminal, so as to utilize the power switch to discharge charge stored in the input capacitor.

2. The power conversion device according to claim 1, wherein the second controller comprises:
   a detection circuit coupled to the input terminal and configured to detect the signal waveform at the input terminal and generate a state signal according to the signal waveform of the input terminal,
   wherein when detecting a waveform of the input AC power, the detection circuit generates the state signal having a first voltage value,
   when not detecting the waveform of the input AC power within a preset time length, the detection circuit generates the state signal having a second voltage value, and
   the preset time length is equal to a plurality of cycles of the input AC power.

3. The power conversion device according to claim 2, wherein the second controller disables the first controller in response to the state signal having the second voltage value, and causes the charge stored in the input capacitor to flow through the first terminal of the power switch and a second terminal of the power switch.

4. The power conversion device according to claim 3, wherein the second controller further comprises:
   a discharge control circuit coupled to the detection circuit and the first controller and configured to be disabled in response to the state signal having the first voltage value and enabled in response to the state signal having the second voltage value to control the power switch, so as to discharge the charge stored in the input capacitor.

5. The power conversion device according to claim 4, wherein:
   the power conversion circuit provides a feedback signal based on a current value of a current flowing through the power switch, and
   the discharge control circuit comprises:
   an operational amplifier coupled to the power switch and the detection circuit and configured to be enabled in response to the state signal having the second voltage value to control the power switch according to a comparison result between the feedback signal and a reference signal.

6. The power conversion device according to claim 5, wherein the power conversion circuit further comprises:
   a current value sensing circuit coupled between the second terminal of the power switch and a reference low voltage and configured to provide the feedback signal in response to the current value of the current flowing through the power switch.

7. The power conversion device according to claim 5, wherein the power conversion circuit further comprises:
   a current value sensing circuit coupled between a low voltage terminal of a bridge rectifier of the rectifier circuit and a reference low voltage and configured to provide the feedback signal in response to the current value of the current flowing through the power switch.

8. The power conversion device according to claim 2, wherein:
   the power conversion circuit provides a feedback signal based on a current value of a current flowing through the power switch,
   the second controller detects the signal waveform at the input terminal to determine whether the power conversion circuit receives the input AC power, and
   when the power conversion circuit does not receive the input AC power, the second controller controls the first controller to cause the power conversion circuit to convert the charge stored in the input capacitor into the output power, so as to consume the charge stored in the input capacitor.

9. The power conversion device according to claim 8, wherein based on control of the second controller, the first controller generates a pulse-width modulation signal according to fluctuation of the feedback signal and the second voltage value, generates a driving signal according to the pulse-width modulation signal, and provides the driving signal to the control terminal of the power switch.

10. The power conversion device according to claim 9, wherein a duty cycle of the driving signal is related to a voltage value of the feedback signal.

11. The power conversion device according to claim 1, wherein the power conversion circuit further comprises:
    a boost inductor coupled between the rectifier circuit and the first terminal of the power switch;
    an output diode, wherein an anode of the output diode is coupled to the first terminal of the power switch and a cathode of the output diode serves as an output terminal of the power conversion circuit; and
    an output capacitor coupled between the cathode of the output diode and a reference low voltage.

12. A control circuit for controlling a power conversion circuit, wherein the power conversion circuit comprises an input capacitor, a rectifier circuit, and a power switch, wherein the input capacitor is coupled to an input terminal of a power conversion device, the rectifier circuit is configured to convert an input AC power into a rectified power, and a first terminal of the power switch is coupled to the rectifier circuit, the control circuit comprising:

- a first controller coupled to a control terminal of the power switch and configured to operate the power switch to cause the power conversion circuit to convert the rectified power into an output power; and
- a second controller coupled to the input terminal and the first controller and configured to detect a signal waveform at the input terminal and control the first controller in response to the signal waveform at the input terminal, so as to utilize the power switch to discharge charge stored in the input capacitor.

* * * * *